US012527860B2

(12) United States Patent
van der Kleij et al.

(10) Patent No.: US 12,527,860 B2
(45) Date of Patent: Jan. 20, 2026

(54) COMPOSITIONS FOR IMMUNOTHERAPY

(71) Applicant: Hal Allergy Holding B.V., Leiden (NL)

(72) Inventors: Joanna Paulina Maria van der Kleij, Haarlem (NL); Dirk Jan Elbertus Opstelten, Oegstgeest (NL)

(73) Assignee: HAL Allergy Holding B.V., Leiden (NL)

( * ) Notice: Subject to any disclaimer, the term of this patent is extended or adjusted under 35 U.S.C. 154(b) by 205 days.

(21) Appl. No.: 16/891,208

(22) Filed: Jun. 3, 2020

(65) Prior Publication Data

US 2020/0289642 A1    Sep. 17, 2020

Related U.S. Application Data

(63) Continuation of application No. 14/435,262, filed as application No. PCT/EP2012/070810 on Oct. 19, 2012, now abandoned.

(51) Int. Cl.
*A61K 39/35*    (2006.01)
*A61K 39/00*    (2006.01)

(52) U.S. Cl.
CPC .... *A61K 39/35* (2013.01); *A61K 2039/55505* (2013.01)

(58) Field of Classification Search
None
See application file for complete search history.

(56) References Cited

U.S. PATENT DOCUMENTS

| 9,526,781 | B2 | 12/2016 | Koppelman et al. |
| 2010/0086568 | A1 | 4/2010 | Koppelman et al. |
| 2010/0136093 | A1 | 6/2010 | Mondoulet et al. |
| 2012/0141536 | A1 | 6/2012 | Wustenberg |

FOREIGN PATENT DOCUMENTS

| EP | 0416816 A1 | 3/1991 |
| EP | 2140880 A1 | 1/2010 |
| WO | 2010000873 A1 | 1/2010 |

OTHER PUBLICATIONS

Norimatsu et al. 'Effects of aluminum adjuvant on systemic reactions of lipopolysaccharides in swine.' Vaccine 13, 1325-1329, 1995.*
Shi, Y. et al. Detoxification of endotoxin by aluminum hydroxide adjuvant. Vaccine (19):1747-1752, 2001.*
Rueff et al. 'Specific immunotherapy in honeybee venom allergy: a comparative study using aqueous and aluminium hydroxide adsorbed preparations'. Allergy 59: 589-595, 2004. (abstract only).*
Hogenesch et al. 'Mechanism of immunopotentiation and safety of aluminum adjuvants.' Front. Immunol. Front. Immunol., Jan. 10, 2013 Sec. Vaccines and Molecular Therapeutics https://doi.org/10.3389/fimmu.2012.00406.*
Van de Kleij et al. 'A Peanut Allergoid with Increased Safety and Maintained Immunogenicity.' vol. 127, Issue 2, Supplement , AB32, Feb. 1, 2011.*
Relyveld et al. Allergens adsorbed on aluminum hydroxide preparation, standardization controls and therapeutic results. Dev. Biol. Stand 29:295-307, 1975.*
Bindslev-Jensen J. Allergy Clin Immunol. 139(2); AB191, Abstract 607. Feb. 2017.*
Shishehbor et al., "Quercetin effectively quells peanut-induced anaphylactic reactions in the peanut sensitized rats", Iran J Allergy Asthma Immunol., 2010, pp. 27-34, vol. 9, No. 1.
Van Der Kleij et al., "A Peanut Allergoid with Increased Safety and Maintained Immunogenicity", The Journal of Allergy and Clinical Immunology, 2011, Supplement p. AB32, vol. 127, No. 2.
Wyss, "Immunotherapy with aluminum hydroxide adsorbed insect venom extracts (Alutard SQ): immunologic and clinical results of a prospective study over 3 years", Allergy, 1993, pp. 81-86, vol. 48, No. 2.

* cited by examiner

*Primary Examiner* — Nora M Rooney
(74) *Attorney, Agent, or Firm* — The Webb Law Firm

(57) ABSTRACT

The present invention relates to compositions which can be used in immunotherapy and especially to compositions which can be used in immunotherapy for mammals suffering from a peanut allergy. The present invention further relates to the use of the present compositions for the treatment of a mammal suffering from an allergy by immunotherapy and the use of the present compositions in a prophylactic treatment for desentizing the immune system of a mammal for an allergen. Specifically, the present invention relates compositions suitable for immunotherapy comprising an allergen, wherein substantially 100% of said allergen in said composition is complexed with aluminum.

11 Claims, 7 Drawing Sheets

Figure 1:
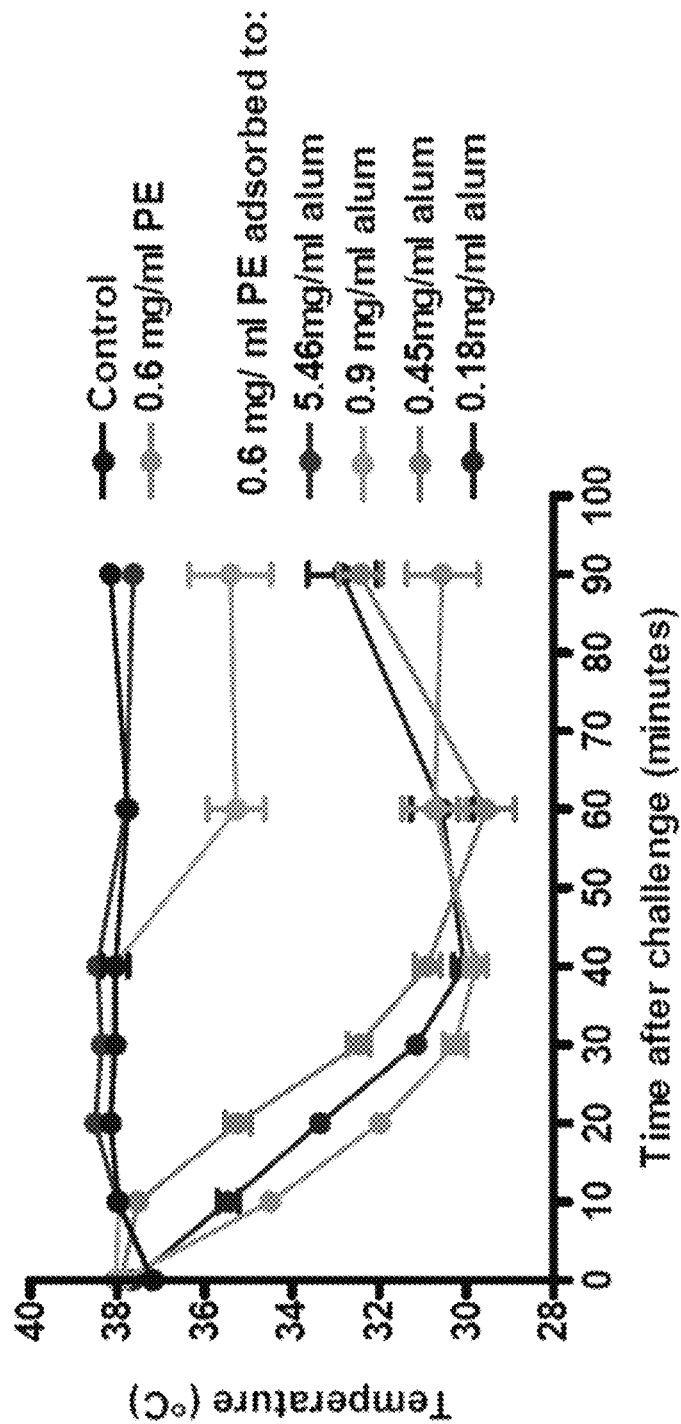

Figure 7
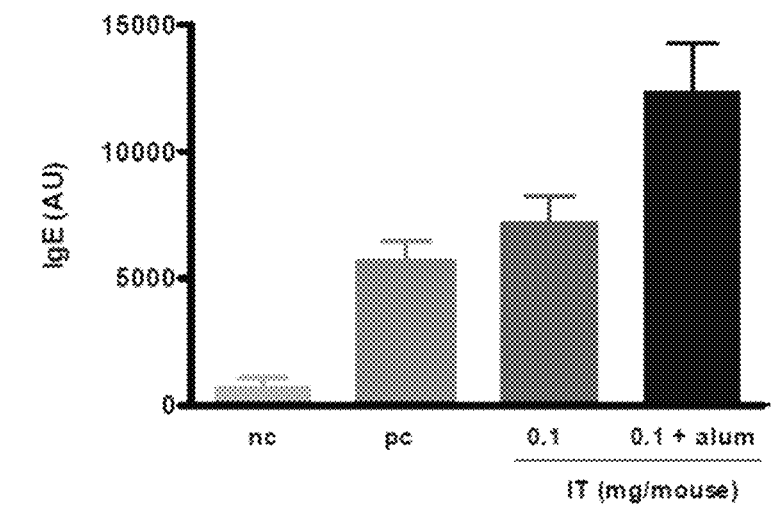
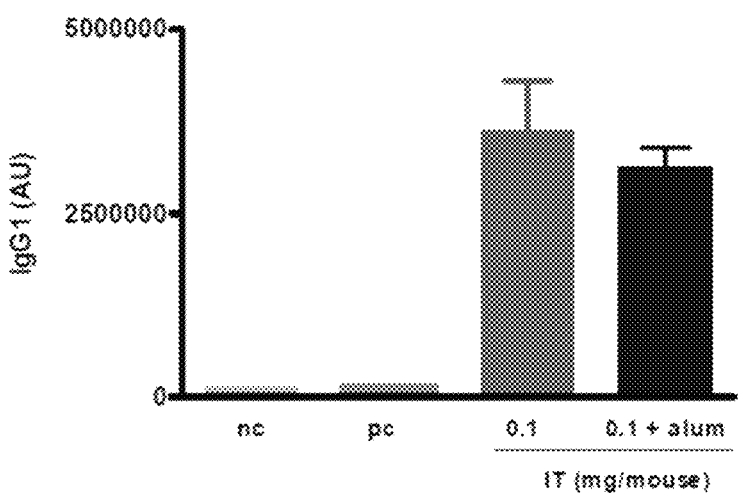
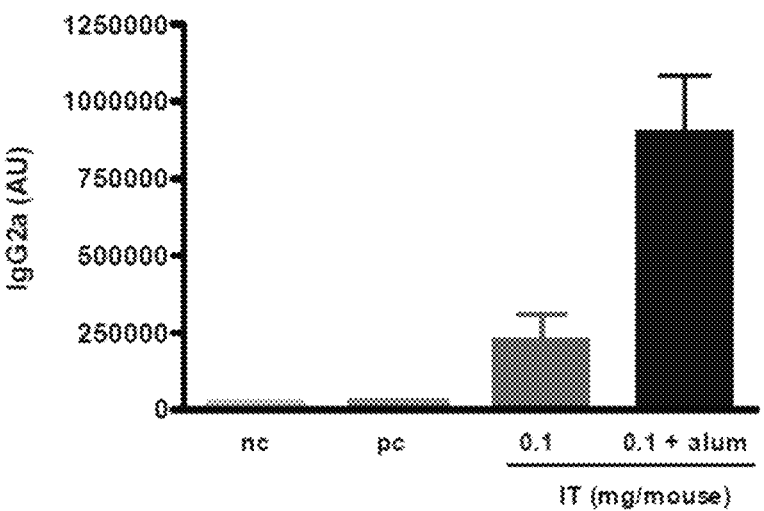

COMPOSITIONS FOR IMMUNOTHERAPY

The present application is a continuation of U.S. patent application Ser. No. 14/435,262, filed Apr. 13, 2015, which is a national stage application of PCT/EP2012/070810, filed Oct. 19, 2012.

DESCRIPTION

The present invention relates to compositions which can be used in immunotherapy and especially to compositions which can be used in immunotherapy for mammals, such as human mammals, suffering from peanut allergy. The present invention further relates to the use of the present compositions for the therapeutic treatment for desentizing the immune system of a mammal suffering from an allergy by immunotherapy and the use of the present compositions in a prophylactic treatment of a mammal with high predisposition to develop a certain allergy.

Allergen immunotherapy, also termed hyposensitization therapy, immunologic desensitization, hyposensibilization, or allergen-specific immunotherapy, is a form of immunotherapy for allergic disorders in which the patient is vaccinated with increasingly larger doses of an allergen, i.e. the substance, or substances, to which they are allergic, with the aim of inducing immunologic tolerance.

Allergen specific immunotherapy is the only treatment strategy which treats the underlying cause of an allergic disorder. It is a highly cost-effective treatment strategy and results in an improved quality of life.

Immunotherapy has been shown to produce long-term remission of allergic symptoms, to reduce severity of associated allergic response, as well to reduce the chances of new sensitizations to allergens developing. Immunotherapy aims to modulate the immune system's response to allergens.

Immunotherapy generally encompasses repeated exposure to a specific allergen via, for example, sublingual or subcutaneous routes, thereby providing a desensitization of the allergic patient to the allergen and thus a reduction in allergic symptoms and use of symptomatic based treatments.

The exact mechanism underlying immunotherapy is not fully known but it is accepted that immunotherapy leads to alteration of the immune response to an allergen. The modification at least comprises a change in IgE synthesis and the production of IgE blocking antibodies reducing the allergic response of the immune system to specific allergens. Also an increase in conversion of Th2 to Th1/T regulatory cells is observed. At a molecular level, part of the underlying mechanism relies on the preferential induction of allergen-specific IgG to neutralize an allergen and a reduction of allergen-specific IgE.

Immunotherapy generally involves exposing an allergic patient to low doses of an allergen. The dose is gradually increased on a regular, for example weekly, basis, until a "maintenance" dose is reached. This translates in approximately four months of weekly injections to reach the maintenance dose. Once the maintenance dose is reached, the injections are administered less often, for example once per month for a few years. Generally, the longer the treatment and the higher the dose, the greater the therapeutic benefit.

After successful completion of immunotherapy, long-term protection can be expected for a period of 3 to 5 years or more. Therapy can be repeated should symptoms begin to return or if the individual becomes exposed to new allergens that were not included in the previous treatment regimen.

Peanuts are one of the most common foods responsible for food-induced allergy. A curative treatment for peanut allergy is not yet available. Specific immunotherapy (SIT) using aqueous peanut extract displayed an increased tolerance to oral ingestion of peanuts. However, as reported by Nelson et al. (J. Allergy Clin. Immunol. 1997 June; 99(6 Pt 1):744-51), aqueous peanut extracts resulted in unacceptable systemic reactions, even during the maintenance injections. Accordingly, the Nelson et al. concluded: "For clinical application of this method of treatment, a modified peanut extract is needed."

Considering the clinical relevance of immunotherapy, there is a continuous need in the art for compositions suitable for immunotherapy and especially immunotherapy effective against peanut allergy. A perquisite for these compositions is that the compositions need to be, besides providing an alteration of the immune response upon exposure to an allergen, safe, i.e. the compositions must not trigger an allergic reaction and, in the most severe case, an anaphylactic shock.

Considering the above need in the art, it is an object of the present invention, amongst other objects, to provide compositions suitable for immunotherapy and especially immunotherapy directed to peanut allergy.

This object of the present invention, amongst other objects, is met by a composition suitable for immunotherapy as defined in the appended claims.

Specifically, this object of the present invention, amongst other objects, is met, according to a first aspect, by a composition suitable for immunotherapy comprising an allergen, wherein substantially 100% of said allergen in said composition is complexed with aluminum.

Within the context of the present invention, an allergen is defined as an antigen capable of stimulating a hypersensitivity reaction in atopic mammals through immunoglobulin E (IgE) responses. Most mammals mount significant immunoglobulin E responses only as a defense against parasitic infections. However, some mammals may respond to many common environmental antigens. This hereditary predisposition is also designated atopy. In atopic mammals, non-parasitic antigens stimulate undesired IgE production, resulting in hypersensitivity or allergy.

Common allergens include antigens found in animal products such as Fel d 1 (cat allergy), fur and dander, cockroach calyx, wool and dust mite excretion; drugs such as penicillin, sulphonamides, and salicylates; foods such as celery and celeriac, corn or maize, eggs (typically egg white), fruit, pumpkin, egg-plant, legumes, beans, peas, peanuts, soybeans, milk, seafood, sesame, soy, tree nuts, pecans, almonds, and wheat; insect stings such as bee sting venom, wasp sting venom, and mosquito stings; mold spores; latex; metal; and plant pollen such as grasses and tree pollen.

Within the context of the present invention, the terms "allergen", "allergens", "antigen" and "antigens" are used interchangeably unless indicated otherwise.

The present inventors have surprisingly found that when substantially 100%, such as more than 99%, of an allergen in a preparation is complexed, or conjugated with, or bound to aluminum, no clinically relevant allergic reactions, i.e. mast cell-mediated systemic responses, are observed although the aluminum complexed allergen is still capable of inducing an IgG response thereby providing a composition especially suitable to be used in immunotherapy.

Mast cell-mediated systemic responses can be readily measured by a lowering of the body temperature after exposure to an allergen.

According to a preferred embodiment of this first aspect of the present invention, the present aluminum complexed, bound, or conjugated allergen is a peanut kernel protein extract, preferably a peanut kernel protein extract being modified by reduction and subsequent alkylation.

The present peanut kernel protein extract can be obtained by a) grinding peanuts for providing a peanut powder; b) incubating the peanut powder in acetone during 30 minutes using 5 grams peanut powder per 50 ml acetone for providing a defatted peanut powder; c) drying the defatted peanut powder; d) suspending the dried peanut powder in a buffer with a pH between 7 and 9; and e) isolating the resulting supernatant of step (d) thereby providing a peanut kernel protein extract.

Reduction of the present peanut extract can be provided by contacting the extract with one or more reducing agents chosen from the group consisting of 2-mercaptoethanol (β-ME), dithiothreitol (DTT), dithioerythritol, cysteine, homocystein, tributylphosphine, sulfite, tris(2-carboxyethyl) phosphine (TCEP), sodium (cyano) borohydride, lye, glutathione, E-mercapto ethylamine, thioglycollic acid, methyl sulfide, and ethyl sulfide.

Subsequent alkylation of the present extract can be provided by contacting the reduced extract with one or more alkylating agents chosen from the group consisting of N-ethylmalimide, cystamine, iodoacetamide, iodoacetic acid, alkylhalogenides; alkylsulfates; alkenes, preferably terminal alkenes $(H_2C)=C(H)-R$, and enzymes.

According to another preferred embodiment of this first aspect of the present invention, the present a peanut kernel protein extract comprises at least the major peanut allergens Ara h1, Ara h2 and Ara h6.

Peanut allergenic protein Ara h1 was described as a 63.5 kDa protein occurring naturally in a trimeric form of approximately 180 kDa through non-covalent interactions. The trimeric Ara h1 structures often aggregate, forming multimers of up to 600-700 kDa. Peanut allergenic protein Ara h2 migrates as a doublet at approximately 20 kDa. This doublet consists of two isoforms that are nearly identical except for the insertion of the sequence DPYSPS in the higher molecular weight isoform. Peanut allergenic protein Ara h6, was identified as a protein with a molecular weight of approximately 15 kDa based on SDS-PAGE and 14,981 Da as determined by mass spectroscopy.

According to yet another preferred embodiment of this first aspect of the present invention, the present allergen is an allergenic protein, preferably of protein selected from the group consisting of food proteins or venom proteins.

The present composition preferably comprises pharmaceutically acceptable carriers, diluents and/or excipients.

Considering the beneficial properties of the present compositions in immunotherapy, the present invention relates, according to a second aspect, to a composition comprising an allergen, wherein substantially 100% of said allergen in said composition is complexed with aluminum, for use in a therapeutic or prophylactic treatment of a mammal, preferably a human mammal, suffering from an allergy by immunotherapy.

According to an especially preferred embodiment of this second aspect, the allergen is a peanut kernel protein extract, preferably modified by reduction and subsequent alkylation, and the allergy is peanut allergy.

Considering the beneficial properties of the present compositions in immunotherapy, the present invention relates, according to a third aspect, to a composition comprising an allergen, wherein substantially 100% of said allergen in said composition is complexed with aluminum, for use in a prophylactic treatment for desentizing the immune system of a mammal, preferably a human mammal, for said allergen.

According to an especially preferred embodiment of this third aspect, the allergen is a peanut kernel protein extract, preferably modified by reduction and subsequent alkylation, and the immune system is desensitized for exposure to peanuts.

According to a fourth aspect, the present invention relates to a composition comprising an allergen, wherein substantially 100% of said allergen in said composition is complexed with aluminum, for use in medicine.

According to a fifth aspect, the present invention relates to a method for immunotherapy comprising administering to a mammal, preferably a human mammal, suffering from an allergy a composition comprising an allergen, wherein substantially 100% of said allergen in said composition is complexed with aluminum, in a sufficient amount and during sufficient time to reduce, or eliminate, an allergic response of said mammal to said allergen.

A typical sufficient amount will be from about 0.1 ng/kg to 10 mg/kg, 10 ng/kg to about 100 µg/kg, or 0.1 µg/kg to 1 µg/kg of the aluminum complexed allergen relative to the body weight of the individual to which it is administered. Often, a treatment will comprise starting with the administration of dosages at the lower end of these ranges and increasing the dosages as the treatment progresses.

For desensitization treatment, it is typically necessary for the patient to receive frequent administrations, e.g., initially every one, two or three days, gradually reducing to once every two or three weeks. Other suitable desensitization programs include subcutaneous injections once every 2-4 weeks the dosage of which injections may gradually increase over a period of 3-6 months, and then continuing every 2-4 weeks for a period of up to about 5 years. It is also possible, particular for sublingual administration, that daily administrations are given.

Desensitization protocols may also comprise a form of treatment conventionally known in various equivalent alternative forms as rapid desensitization, rapid allergen immunotherapy, rapid allergen vaccination, and rapid or rush immunotherapy. In broad terms, this procedure aims to advance an allergic patient to an immunizing or maintenance dose of extract (i.e., allergen) by administering a series of injections (or via another suitable carrier) of increasing doses of the allergen at frequent (e.g. hourly) intervals. If successful, the patient will exhibit an improved resistance to the allergen, possibly even presenting a total non-reactivity to any subsequent allergen exposure.

Various desensitization protocols are known in the art and may for instance comprise a method of treating a patient having an immediate hypersensitivity to an allergen using an accelerated rapid immunotherapy schedule in combination with a method of pre-treating such patient with prednisone and histamine antagonists prior to receiving the accelerated immunotherapy.

According to an especially preferred embodiment of this fifth aspect, the allergen is a peanut kernel protein extract, preferably modified by reduction and subsequent alkylation, and the allergy is peanut allergy.

Figure 2:
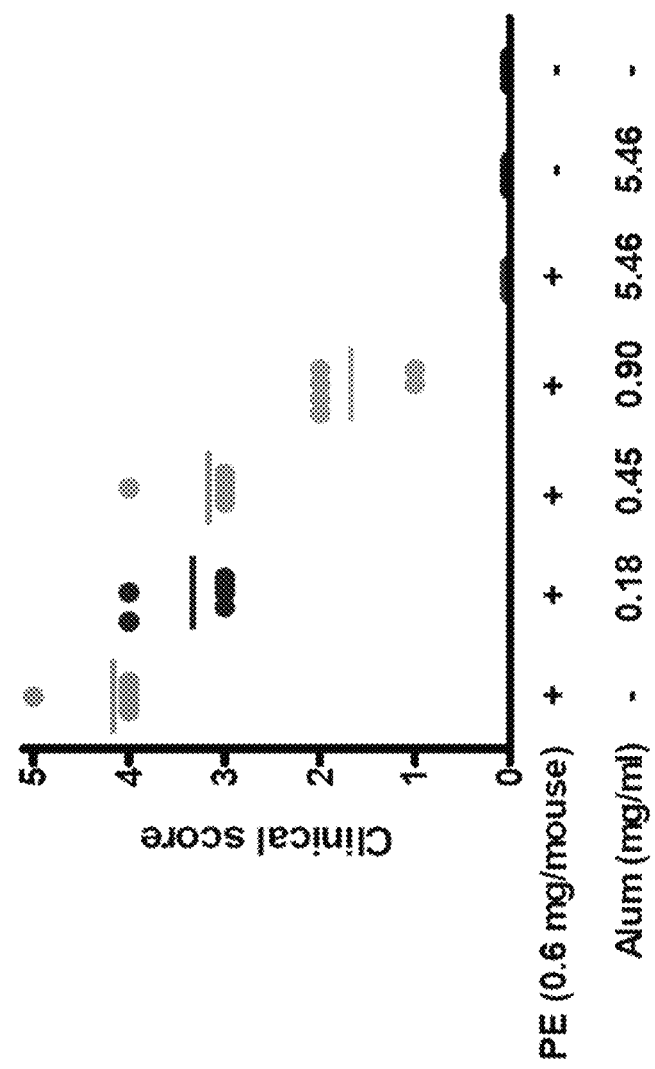

The present invention will be further detailed in the following examples disclosing specifically preferred embodiments of the present invention. In the examples, reference is made to figures wherein:

FIG. 1: shows temperature changes in sensitized mice challenged with different preparations of peanut extract adsorbed to aluminum. Temperature changes were measured for 90 minutes after challenge with 0.6 mg/mouse, 0.6 mg/mouse adsorbed to 0.18 mg/ml alum, 0.45 mg/mouse alum, 0.9 mg/ml alum or 5.46 mg/ml alum. As a control sensitized mice were challenged with PBS/alum;

FIG. 2: shows symptom scores of sensitized mice challenged with different preparations of peanut extract adsorbed to aluminum. Symptom scores were assigned after challenge on a scale from 0 (no symptoms) to 5 (death).

Figure 3:
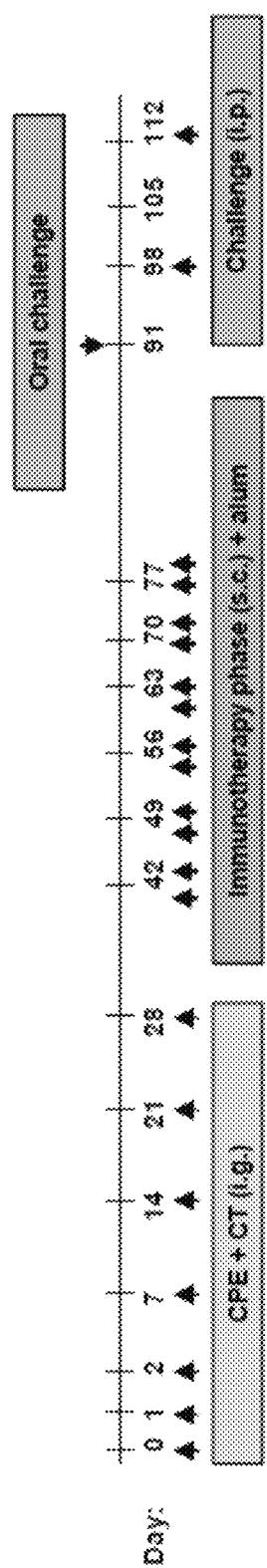
Figure 4:
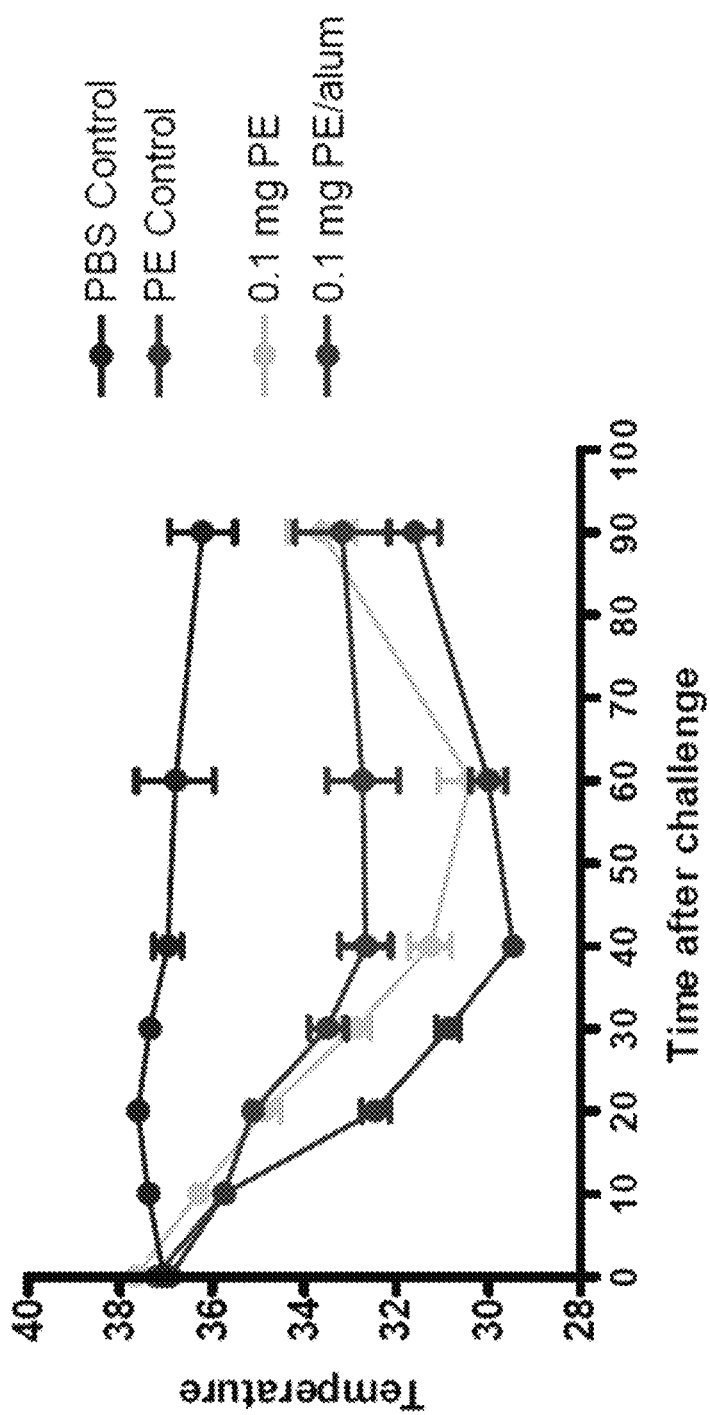
Figure 5:
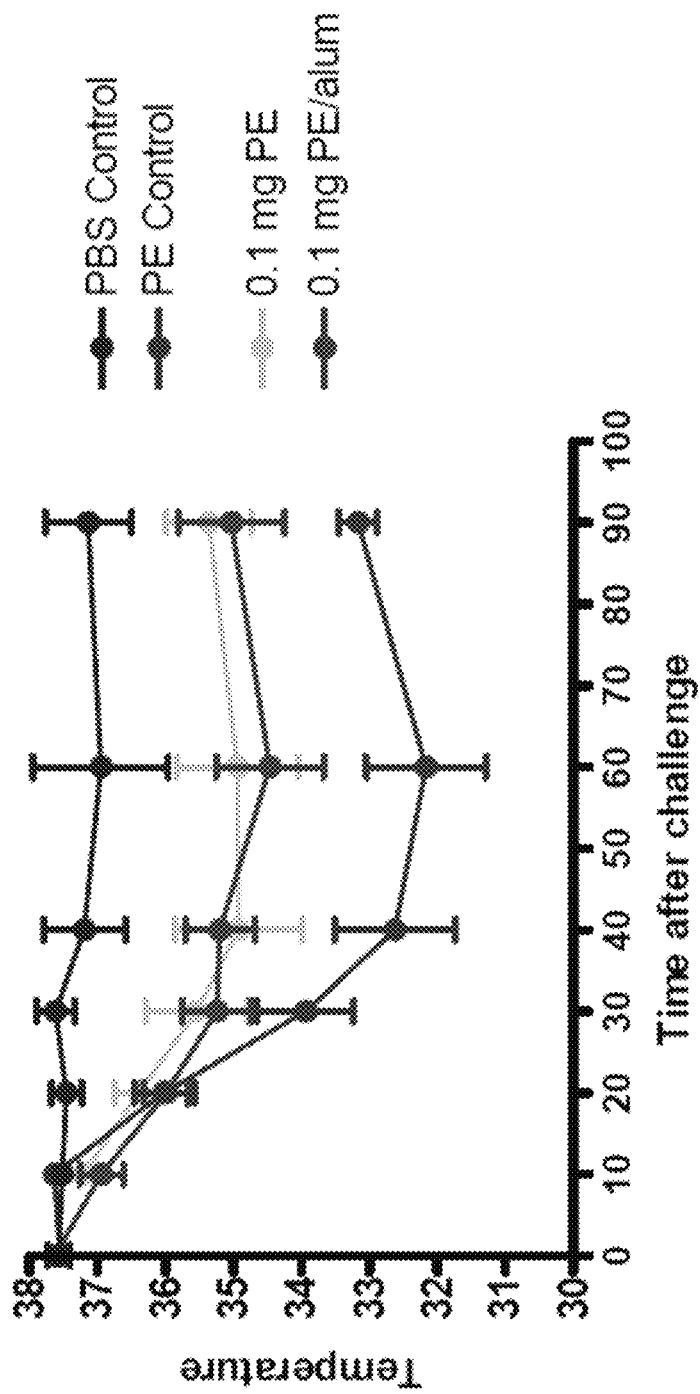
Figure 6:
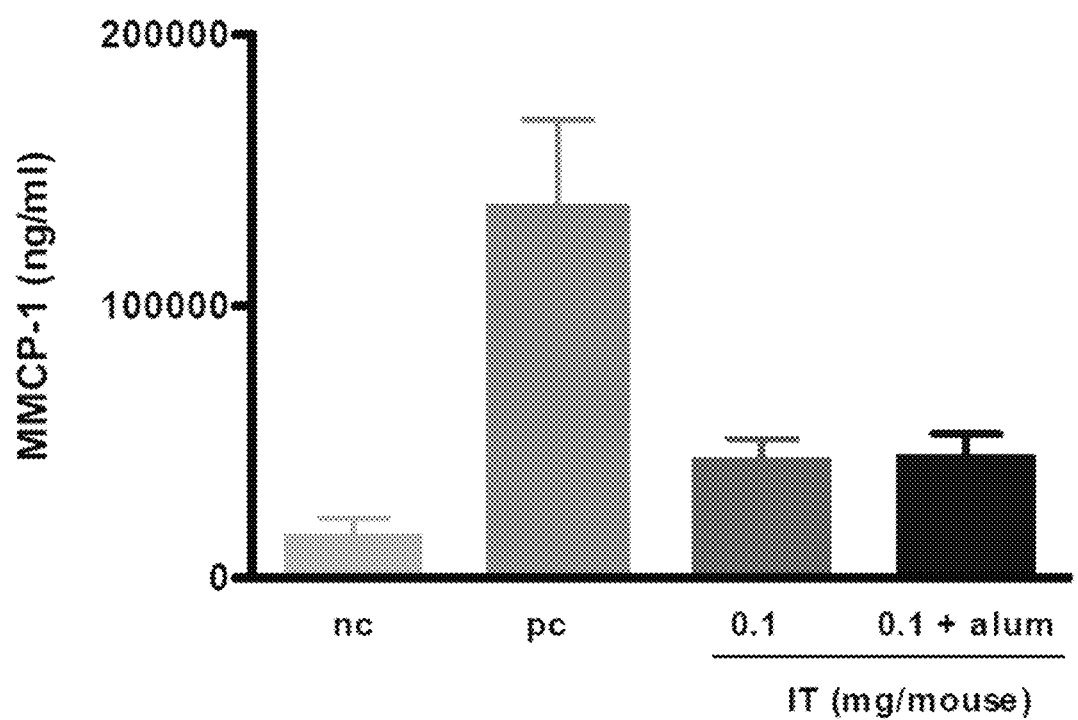

FIG. 3: shows a schematic overview of the time lime used for sensitization and challenge;

FIG. 4: shows the results of an i.p. challenge at day 98 in vivo mouse model for peanut allergy;

FIG. 5: shows the results of an i.p. challenge at day 112 in vivo mouse model for peanut allergy;

FIG. 6: shows the results mast protease secretion 1 (mMCP-1) one day after challenge in vivo mouse model for peanut allergy;

FIG. 7: shows IgE, IgG1 and IgG2a antibody levels in all groups tested of the in vivo mouse model for peanut allergy.

EXAMPLES

Example 1: Complexing of Aluminum and an Allergen Significantly Increases Safety Introduction This example demonstrates that the complexing of aluminum with an allergen significantly increases safety of a composition used for immunotherapy. This was demonstrated using an antigenic peanut extract coupled to different concentrations of aluminum hydroxide. In an in vivo mouse model for peanut allergy, these different test preparations were analyzed for safety.

Material and Methods

Mice

Five-week-old specific pathogen-free female C3H/HeOuJ mice were purchased from Charles River, France. All mice were housed under specific pathogen-free conditions within the animal care facility at the Utrecht University, The Netherlands. Experiments were approved by the Animal Experiments Committee of the Utrecht University. The diet used contained vegetable protein (including soy) but was free of peanut proteins.

Test Preparations

Previous studies have demonstrated that a challenge of 0.6 mg peanut extract (PE) per mouse that is not bound to aluminum results in a profound anaphylactic response. It is also know that a challenge with 0.1 mg PE is capable of inducing profound changes in temperature and symptom score in sensitized mice.

In a pilot study, the relation between the amount of aluminum added and the percentage of aluminum complexed peanut extract was investigated. For this, different amounts of aluminum hydroxide were added to a sample of peanut extract (100% protein) and the sample was centrifuged to pellet the aluminum complexed peanut extract. Subsequently, the percentage free protein in the supernatant was determined for assessing the amount of pelleted, thus aluminum complexed, allergen wherein the percentage aluminum complexed allergen is 100%—the percentage free protein found in the supernatant.

The different aluminum concentrations used in the present example were based on the binding of ~100% (5.46 mg/ml) or ~90% (0.9 mg/ml alum), ~70% (0.45 mg/ml alum), ~40% (0.18 mg/ml alum) of the total extract. A positive control (0.6 mg/ml PE without alum) was also included.

Sensitization and Challenge

Mice (n=6) were sensitized by intragastric (i.g.) administration of 6 mg peanut extract (PE) and 15 μg Cholera Toxin (CT, List Biological Laboratories, Inc.) in 400 μL PBS per mouse on days 0, 1, 2, 7, 14, 21, 28. Control mice received PBS with 15 μg CT/mouse in 400 μL PBS per mouse. On day 42, all groups of mice were subcutaneously (s.c) challenged in the neck with 200 μl of the different test preparations or their respective control.

Assessment of Anaphylaxis

As an objective parameter of anaphylactic shock, body temperature was measured by means of rectal thermometry every 10-20 minutes for 90 minutes after s.c. challenge. In addition, clinical symptoms were scored using a scoring system from 0 (no symptoms) to 5 (death).

Results

The percentage aluminum complexed peanut extract was determined and the results are summarized in Table 1 below.

TABLE 1

Percentage aluminum complex peanut extract

| Preparation per mouse | Aluminum hydroxide concentration (mg/ml) | Percentage free protein | Percentage complexed protein |
|---|---|---|---|
| 0.6 mg PE | 0 | 100% | 0% |
| 0.6 mg PE | 0.18 | 60% | 40% |
| 0.6 mg PE | 0.45 | 30% | 70% |
| 0.6 mg PE | 0.9 | 10% | 90% |
| 0.6 mg PE | 5.46 | 0% | 100% |

A subcutaneous challenge with 0.6 mg non-complexed PE per mouse resulted a severe anaphylactic shock response in all mice as measured by their temperature drop (FIG. 1) and clinical symptom score (FIG. 2). When the peanut preparation was fully (100%) adsorbed to aluminum, none of the mice showed any signs of anaphylactic shock symptoms.

Challenging mice with preparations containing different amounts of aluminum only securing partial adsorption of PE resulted in a delayed response in the groups challenged with the preparation containing 60% and 30% non-adsorbed material. In the group challenged with the preparation containing ~10% non-adsorbed material there was a delay as well as a decrease in the response. Non-sensitized mice did not respond to any of the challenges (data not shown) and sensitized mice that were challenged with aluminum only also showed no response.

Conclusion

Mice that were sensitized and challenged with preparations containing similar amounts of PE but varying amounts of alum responded differently to a challenge. Complete (100%) binding of PE to aluminum aborted the potency of the peanut extract whereas partial binding still resulted in an anaphylactic response. The present example clearly shows the potency of aluminum to prevent mice from suffering an anaphylactic shock.

Example 2: Complexing of Aluminum and an Allergen Significantly Increases the Response of the Immune System Resulting to an Increased Efficacy Profile Introduction This example demonstrates that the complexing of aluminum with an allergen significantly increases the response of the immune system resulting to an increased efficacy profile. This was demonstrated using an antigenic peanut extract coupled to aluminum hydroxide. In an in vivo mouse model for peanut allergy an immunotherapy, test preparations were analyzed for efficacy.

Material and Methods

Mice

Five-week-old specific pathogen-free female C3H/HeOuJ mice were purchased from Charles River, France. All mice were housed under specific pathogen-free conditions within the animal care facility at the Utrecht University, The Netherlands. Experiments were approved by the Animal Experiments Committee of the Utrecht University. The diet used contained vegetable protein (including soy) but was free of peanut proteins.

Sensitization and Challenge

Mice (n=6 per group) were sensitized by intragastric (i.g.) administration of 6 mg peanut extract (PE) and 15 µg Cholera Toxin (CT, List Biological Laboratories, Inc.) in 400 µl PBS per mouse on days 0, 1, 2, 7, 14, 21, 28. Control mice received PBS with 15 µg CT/mouse in 400 µl PBS per mouse. From day 42, all groups of mice were subcutaneously (s.c.) de-sensitized in the neck, twice a week for six weeks, with 200 µl of the different test preparations or their respective control (FIG. 3). The test preparations were tested in a concentration of 0.1 mg/mouse per injection and were either non-adsorbed or adsorbed to 1.82 mg/ml aluminum.

Assessment of Anaphylaxis

As an objective parameter of anaphylactic shock, body temperature was measured by means of rectal thermometry every 10-20 minutes for 90 minutes after i.p. challenge. One day after challenge, blood was taken for the measurement of antibodies and mMCP-1 (mast cell protease 1). On day 98 and 112, mice were challenge i.p. and their body temperature was followed for 90 minutes after challenge.

Results

An i.p. challenge was given on day 98 and 112. The data show that on day 112 both immunotherapy preparations (peanut extract alone and adsorbed to alum) effectively reduced the anaphylactic response as measured by the drop in temperature after challenge (FIG. 5).

On day 98, the alum-adsorbed extract showed a greater efficacy compared to the non-adsorbed extract (FIG. 4) demonstrating that the presence of alum results in a preparation that reaches efficacy at an earlier time point compared to the non-alum preparation.

No differences between the 2 preparations were found in the secretion of the mast protease 1 (mMCP-1) in the serum one day after the challenge (FIG. 6). However, immunotherapy with both preparations was capable of down-regulating mast cell activation, as the release of mMCP-1 was significantly greater in the group of allergic mice that did not receive immunotherapy (FIG. 6).

Antibodies (IgE, IgG1 and IgG2a) were determined in the serum of all groups (FIG. 7). IgE levels were elevated in all groups compared to the negative control (PBS). The group de-sensitized with the alum-adsorbed peanut extract showed a trend towards an elevated IgE level (FIG. 7A) demonstrating a boost of the immune system after the injection of an alum-adsorbed preparation.

Mice that received immunotherapy displayed an increased level of IgG1 in the serum with comparable levels between the alum-adsorbed and non-adsorbed extract (FIG. 7B). The increase of IgG2a levels (comparable with IgG4 in human) is dominated by the group treated with the alum-adsorbed peanut preparation (FIG. 7C).

Conclusion

The adsorption of alum to a peanut extract results in a boost of the immune system leading to an efficacious treatment at an earlier time point. Without wishing to be bound to any theory, this could be due to the elevated levels of IgG2a (comparable to IgG4 in human) in the serum of these mice.

The invention claimed is:

1. A composition suitable for subcutaneous immunotherapy comprising an allergen, wherein substantially 100% of said allergen in said composition is complexed, or conjugated, with aluminum, wherein said allergen is a peanut kernel protein extract, wherein said allergen is not modified by reduction and alkylation, and wherein the composition is formulated for subcutaneous administration.

2. The composition according to claim 1, wherein said peanut kernel protein extract comprises at least Ara h1, Ara h2 and Ara h6 or Ara h2, and Ara h6.

3. The composition according to claim 1, said composition further comprises one or more pharmaceutically acceptable carriers, diluents and/or excipients.

4. A method for immunotherapy comprising administering to a mammal suffering from an allergy, or a mammal at risk of developing an allergy, a composition comprising an allergen, wherein substantially 100% of said allergen in said composition is complexed, or conjugated, with aluminum, in an amount sufficient and for a sufficient time to reduce, or eliminate, an allergic response of said mammal to said allergen, wherein said allergen is a peanut kernel protein extract, wherein said allergen is not modified by reduction and alkylation, and wherein said composition is administered subcutaneously to the mammal, and wherein said mammal is a human mammal.

5. The method according to claim 4, wherein the allergic response is an allergic response to peanut exposure.

6. The method according to claim 4, wherein the composition is administered to the mammal every two weeks.

7. The method according to claim 6, wherein the composition is administered to the mammal every two weeks in an escalating titration.

8. The method according to claim 4, wherein the composition is administered to the mammal at a dose of about 0.1 ng/kg to 10 mg/kg.

9. The method according to claim 8, wherein the composition is administered to the mammal in an escalating titration.

10. The composition according to claim 1, wherein 100% of said allergen in said composition is complexed, or conjugated, with aluminum.

11. The method according to claim 4, wherein 100% of said allergen in said composition is complexed, or conjugated, with aluminum.

* * * * *